United States Patent
Toderici et al.

(10) Patent No.: US 12,432,389 B2
(45) Date of Patent: Sep. 30, 2025

(54) VIDEO COMPRESSION USING OPTICAL FLOW

(71) Applicant: Google LLC, Mountain View, CA (US)

(72) Inventors: George Dan Toderici, Mountain View, CA (US); Eirikur Thor Agustsson, Zurich (CH); Fabian Julius Mentzer, Zurich (CH); David Charles Minnen, Mountain View, CA (US); Johannes Balle, San Francisco, CA (US); Nicholas Johnston, San Jose, CA (US)

(73) Assignee: Google LLC, Mountain View, CA (US)

( * ) Notice: Subject to any disclaimer, the term of this patent is extended or adjusted under 35 U.S.C. 154(b) by 4 days.

(21) Appl. No.: 18/563,734

(22) PCT Filed: Jul. 5, 2022

(86) PCT No.: PCT/US2022/036111
§ 371 (c)(1),
(2) Date: Nov. 22, 2023

(87) PCT Pub. No.: WO2023/283184
PCT Pub. Date: Jan. 12, 2023

(65) Prior Publication Data
US 2024/0223817 A1 Jul. 4, 2024

Related U.S. Application Data

(60) Provisional application No. 63/218,853, filed on Jul. 6, 2021.

(51) Int. Cl.
*H04N 19/91* (2014.01)
*G06T 3/18* (2024.01)
(Continued)

(52) U.S. Cl.
CPC ............... *H04N 19/91* (2014.11); *G06T 3/18* (2024.01); *G06T 5/70* (2024.01); *H04N 19/124* (2014.11);
(Continued)

(58) Field of Classification Search
CPC .... H04N 19/91; H04N 19/124; H04N 19/137; G06T 3/18; G06T 5/70; G06T 2207/20084
See application file for complete search history.

(56) References Cited

U.S. PATENT DOCUMENTS 1,399,531 A * 12/1921 Walter ................ H01M 50/434
204/295
2010/0194741 A1* 8/2010 Finocchio ............... G06T 7/269
345/419

(Continued)

OTHER PUBLICATIONS

Agustsson et al., "Generative Adversarial Networks for Extreme Learned Image Compression," Presented at Proceedings of the IEEE/CVF International Conference on Computer Vision (ICCV), Seoul, Korea, Oct. 27-Nov. 2, 2019, pp. 221-231.

(Continued)

*Primary Examiner* — Zaihan Jiang
(74) *Attorney, Agent, or Firm* — Fish & Richardson P.C.

(57) ABSTRACT

Methods, systems, and apparatus, including computer programs encoded on a computer storage medium, for compressing video data. In one aspect, a method comprises: receiving a video sequence of frames; generating, using a flow prediction network, an optical flow between two sequential frames, wherein the two sequential frames comprise a first frame and a second frame that is subsequent the first frame; generating from the optical flow, using a first autoencoder neural network: a predicted optical flow between the first frame and the second frame; and warping a reconstruction of the first frame according to the predicted (Continued)

optical flow and subsequently applying a blurring operation to obtain an initial predicted reconstruction of the second frame.

14 Claims, 7 Drawing Sheets

(51) Int. Cl.
  *G06T 5/70* (2024.01)
  *H04N 19/124* (2014.01)
  *H04N 19/137* (2014.01)
(52) U.S. Cl.
  CPC .. *H04N 19/137* (2014.11); *G06T 2207/20084* (2013.01)

(56) References Cited

U.S. PATENT DOCUMENTS

| | | | | |
|---|---|---|---|---|
| 2015/0365696 | A1* | 12/2015 | Garud | H04N 19/53 375/240.16 |
| 2016/0292826 | A1* | 10/2016 | Beall | G06T 3/60 |
| 2017/0124433 | A1* | 5/2017 | Chandraker | G06N 3/045 |
| 2019/0164296 | A1* | 5/2019 | Chikkerur | G06V 10/62 |
| 2020/0053388 | A1* | 2/2020 | Schroers | H04N 19/537 |
| 2021/0044804 | A1 | 2/2021 | Lu et al. | |
| 2021/0073589 | A1* | 3/2021 | Orhon | G06V 10/776 |
| 2022/0183208 | A1* | 6/2022 | Sibley | G06V 20/56 |
| 2024/0161312 | A1* | 5/2024 | Jeong | G06T 7/269 |

OTHER PUBLICATIONS

Agustsson et al., "Scale-Space Flow for End-to-End Optimized Video Compression," Presented at 2020 IEEE/CVF Conference on Computer Vision and Pattern Recognition (CVPR), Seattle, Washington, Jun. 13-19, 2020, pp. 8503-8512.
Ahmed et al., "Discrete Cosine Transform," IEEE Transactions on Computers, Jan. 1974, C-23(1):90-93.
Aitken et al., "Checkerboard artifact free sub-pixel convolution: A note on sub-pixel convolution, resize convolution and convolution resize," CoRR, Submitted on Jul. 10, 2017, arXiv:1707.02937v1, 16 pages.
Ballé et al., "Variational image compression with a scale hyperprior," Presented at the International Conference on Learning Representations (ICLR), Vancouver, BC, Canada, Apr. 30-May 3, 2018, 47 pages.
Bankoski et al., "Technical overview of VP8, an open source video codec for the web," Presented at 2011 IEEE International Conference on Multimedia and Expo, Barcelona, Spain, Jul. 11-15, 2011, pp. 1-6.
Bellard, "BPG Image format," Apr. 21, 2018, retrieved on Dec. 10, 2024, retrieved from URL <https://bellard.org/bpg/>, 2 pages.
Bhardwaj et al., "An unsupervised information-theoretic perceptual quality metric," CoRR, Submitted on Jan. 10, 2021, arXiv:2006.06752v3, 19 pages.
Blau et al., "Rethinking Lossy Compression: The Rate-Distortion-Perception Tradeoff," CoRR, Submitted on Jul. 30, 2019, arXiv:1901.07821v4, 21 pages.
Blau et al., "The Perception-Distortion Tradeoff," Presented at Proceedings of the IEEE Conference on Computer Vision and Pattern Recognition (CVPR), Salt Lake City, Utah, Jun. 18-12, 2018, pp. 6228-6237.
Chen et al., "An Overview of Core Coding Tools in the AV1 Video Codec," Presented at 2018 Picture Coding Symposium (PCS), San Francisco, CA, USA, Jun. 24-27, 2018, pp. 41-45.
cloud.google.com [online], "AI Platform Data Labeling Service pricing," upon information and belief, available no later than Jul. 6, 2021, retrieved on Dec. 13, 2024, retrieved from URL <https://cloud.google.com/ai-platform/data-labeling/pricing>, 4 pages.

developers.google.com [online], "VideoCategories," Available on or before Jun. 4, 2020, via Internet Archive: Wayback Machine URL <https://web.archive.org/web/20200604194442/https://developers.google.com/youtube/v3/docs/videoCategories>, retrieved on Dec. 19, 2024, URL <https://developers.google.com/youtube/v3/docs/videoCategories>, 2 pages.
Djelouah et al., "Neural Inter-Frame Compression for Video Coding," Presented at Proceedings of the IEEE/CVF International Conference on Computer Vision (ICCV), Seoul Korea, Oct. 27-Nov. 2, 2019, pp. 6421-6429.
github.com [online], "Netflix/vmaf—Video Multi-Method Assessment Fusion," Feb. 22, 2017, retrieved on Dec. 13, 2024, retrieved from URL <https://github.com/Netflix/vmaf/>, 4 pages.
Golinski et al., "Feedback Recurrent Autoencoder for Video Compression," Presented at the Proceedings of the Asian Conference on Computer Vision (ACCV), Kyoto, Japan, Nov. 30-Dec. 4, 2020; Revised Selected Papers, Part IV, Revised Selected Papers Part II, Springer International Publishing, Feb. 25, 2021, 12625:591-607.
Goodfellow et al., "Generative Adversarial Nets," Presented at the Annual Conference on Neural Information Processing Systems, Montreal, Quebec, Canada, Dec. 8-13, 2024, 27:2672-2680.
Goyal, "Theoretical foundations of transform coding," IEEE Signal Processing Magazine, Sep. 2001, 18(5):9-21.
Guo et al., "Dvc: An end-to-end deep video compression framework," Presented at the Proceedings of the IEEE/CVF Conference on Computer Vision and Pattern Recognition, Long Beach, California, Jun. 15-20, 2019, pp. 11006-11015.
Habibian et al., "Video Compression With Rate-Distortion Autoencoders," Presented at Proceedings of the IEEE/CVF International Conference on Computer Vision (ICCV), Seoul, Korea, Oct. 24-Nov. 2, 2019, pp. 7033-7042.
Heusel et al., "GANs Trained by a Two Time-Scale Update Rule Converge to a Local Nash Equilibrium," Presented at the Thirty-First Annual Conference on Neural Information Processing Systems (NIPS), Long Beach, California, Dec. 4-9, 2017, 30:6626-6637.
International Preliminary Report on Patentability in International Appln. No. PCT/US2022/036111, mailed on Jan. 18, 2024, 13 pages.
International Search Report and Written Opinion in International Appln. No. PCT/US2022/036111, mailed on Oct. 19, 2022, 17 pages.
itu.int [online], "H.264 : Advanced video coding for generic audio-visual services," Available on or before Jul. 3, 2021, via Internet Archive: Wayback Machine URL <https://web.archive.org/web/20210703024340/https://www.itu.int/rec/T-REC-H.264/>, retrieved on Dec. 19, 2024, URL </https://www.itu.int/rec/T-REC-H.264/>, 2 pages.
itu.int [online], "H.265 : High efficiency video coding ," Available on or before Oct. 29, 2020, via Internet Archive: Wayback Machine URL <https://web.archive.org/web/20201029050752/https://www.itu.int/rec/T-REC-H.265/>, retrieved on Dec. 19, 2024, URL </https://www.itu.int/rec/T-REC-H.265/>, 2 pages.
Jonschkowski et al., "What Matters in Unsupervised Optical Flow," CoRR, Submitted on Aug. 14, 2020, arXiv:2006.04902v2, 16 pages.
Krizhevsky et al., "ImageNet Classification with Deep Convolutional Neural Networks," Presented at the Twenty-Sixth Annual Conference on Neural Information Processing Systems (NIPS), Lake Tahoe, Nevada, Dec. 3-8, 2012, 25:1097-1105.
Ladune et al., "Optical Flow and Mode Selection for Learning-based Video Coding," CoRR, Submitted on Aug. 6, 2020, arXiv:2008.02580v1, 6 pages.
Li et al., "Deep Contextual Video Compression," Presented at the Thirty-Fifth Annual Conference on Neural Information Processing Systems (NIPS), Virtual, Dec. 6-14, 2021, 34:18114-18125.
Liu et al., "Conditional Entropy Coding for Efficient Video Compression," CoRR, Submitted on Aug. 20, 2020, arXiv:2008.09180v1, 23 pages.
Liu et al., "Neural Video Compression using Spatio-Temporal Priors," CoRR, Submitted on Feb. 21, 2019, arXiv:1902.07383v2, 5 pages.
Mentzer et al., "High-Fidelity Generative Image Compression," CoRR, Submitted on Jul. 10, 2020, arXiv:2006.09965v2, 18 pages.

(56) References Cited

OTHER PUBLICATIONS

Mentzer et al., "Towards Generative Video Compression," CoRR, Submitted on Jul. 26, 2021, arXiv:2107.12038v1, 19 pages.
Mercat et al., "UVG dataset: 50/120fps 4K sequences for video codec analysis and development," Presented at the MMSys '20: Proceedings of the 11th ACM Multimedia Systems Conference, Istanbul, Turkey, Jun. 8-11, 2020, pp. 297-302.
Minnen et al., "Channel-Wise Autoregressive Entropy Models for Learned Image Compression," CoRR, Submitted on Jul. 17, 2020, arXiv:2007.08739v1, 16 pages.
Minnen et al., "Joint Autoregressive and Hierarchical Priors for Learned Image Compression," Presented at the 32nd Conference on Neural Information Processing Systems (NeurIPS 2018), Montreal, Canada, Dec. 2-8, 2018, 31:10771-10780.
Mirza et al., "Conditional Generative Adversarial Nets," CoRR, Submitted on Nov. 6, 2014, arXiv:1411.1784v1, 7 pages.
Mukherjee et al., "The latest open-source video codec VP9—An overview and preliminary results," Presented at the 2013 Picture Coding Symposium (PCS), San Jose, California, Dec. 8-11, 2013, pp. 390-393.
Nehab et al., "A Fresh Look at Generalized Sampling," Now Foundations and Trends, 2012, 87 pages.
Odena et al., "Deconvolution and Checkerboard Artifacts," Distill, Oct. 17, 2016, 1(10):e3, 10 pages.
Platt et al., "Constrained Differential Optimization for Neural Networks," California Institute of Technology, Jan. 1988, 11 pages.
Rippel et al., "ELF-VC: Efficient Learned Flexible-Rate Video Coding," CoRR, Submitted on Apr. 29, 2021, arXiv:2104.14335v1, 14 pages.
Rippel et al., "Learned Video Compression," Presented at the Proceedings of the IEEE/CVF International Conference on Computer Vision, Seoul, Korea, Oct. 27-Nov. 2, 2019; IEEE Xplore, Feb. 27, 2020, pp. 3454-3463.
Rippel et al., "Real-time adaptive image compression," CoRR, Submitted on May 16, 2017, arXiv:1705.05823v1, 16 pages.
Santurkar et al., "Generative compression," CoRR, Submitted on Jun. 4, 2017, arXiv:1703.01467v2, 10 pages.
Shulman et al., "Regularization of discontinuous flow fields," [1989] Proceedings Workshop on Visual Motion, Mar. 20-22, 1989, pp. 81-86.
Theis et al., "A coding theorem for the rate-distortion-perception function," CoRR, Submitted on Apr. 28, 2021, arXiv:2104.13662v1, 5 pages.
Theis et al., "On the advantages of stochastic encoders," CoRR, Submitted on Apr. 29, 2021, arXiv:2102.09270v2, 8 pages.
Tschannen et al., "Deep generative models for distributionpreserving lossy compression," CoRR, Submitted on Oct. 28, 2018, arXiv:1805.11057v2, 27 pages.
Van Rozendaal et al., "Lossy compression with distortion constrained optimization," Proceedings of the IEEE/CVF Conference on Computer Vision and Pattern Recognition Workshops, 2020, pp. 166-167.
Wang et al., "MCL-JCV: a JND-based H.264/AVC video quality assessment dataset," 2016 IEEE International Conference on Image Processing (ICIP), Sep. 25-28, 2016, pp. 1509-1513.
Wang et al., "Multiscale structural similarity for image quality assessment," Proceedings of the 37th IEEE Asilomar Conference on Signals, Systems and Computers, Pacific Grove, CA, Nov. 9-12, 2003.
Wang et al., "Understanding Convolution for Semantic Segmentation," Presented as the 2018 IEEE Winter Conference on Applications of Computer Vision (WACV), Lake Tahoe, Nevada, Mar. 12-15, 2018, pp. 1451-1460.
Wang et al., "Video-to-video synthesis," Advances in Neural Information Processing Systems (NeurIPS), 2018, 13 pages.
Wu et al., "Video Compression through Image Interpolation," Presented at Proceedings of the European Conference on Computer Vision (ECCV), Germany, Munich, Sep. 8-14, 2018, pp. 416-431.
Yang et al., "An introduction to neural data compression," CoRR, Submitted on Feb. 14, 2022, arXiv:2202.06533v1, 90 pages.
Yang et al., "Learning for video compression with recurrent auto-encoder and recurrent probability model," CoRR, Submitted on Dec. 6, 2020, arXiv:2006.13560v4, 17 pages.
Yang, "Hierarchical Autoregressive Modeling for Neural Video Compression," CoRR, Submitted on May 4, 2021, arXiv:2010.10258v2, 15 pages.
Zhang et al., "The unreasonable effectiveness of deep features as a perceptual metric," Proceedings of the IEEE Conference on Computer Vision and Pattern Recognition, 2018, pp. 586-595.
Zhang, "Making convolutional networks shift-invariant again," CoRR, Submitted on Jun. 9, 2019, arXiv:1904.11486v2, 17 pages.
Office Action issued in Japanese Appln. No. 2024-500559, mailed on Feb. 25, 2025, 10 pages (with machine translation).
Pourreza et al., "Extending Neural P-frame Codecs for B-frame Coding," CoRR, Submitted on Mar. 30, 2021, arXiv:2104.00531v1, 16 pages.

\* cited by examiner

VIDEO COMPRESSION USING OPTICAL FLOW

CROSS-REFERENCE TO RELATED APPLICATION

This application is a National Stage Application under 35 U.S.C. § 371 and claims the benefit of International Application No. PCT/US2022/036111, filed Jul. 5, 2022, which claims priority to U.S. Application No. 63/218,853, filed Jul. 6, 2021, the disclosure of which is incorporated herein by reference.

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a compression system implemented as computer programs on one or more computers in one or more locations that can compress video data.

Throughout this specification, a "latent" can refer to an ordered collection of one or more numerical values, e.g., a vector, matrix, or other tensor of numerical values.

Throughout this specification, "quantizing" an input numerical value refers to mapping the input numerical value to an output numerical value that is drawn from a discrete set of possible numerical values. For example, the input numerical value can be mapped to a closest numerical value from the discrete set of possible numerical values. The discrete set of possible numerical values can be, e.g., integer values in the range [0,255], or another appropriate discrete set of numerical values.

Throughout this specification, an optical flow between a first video frame and a second video frame defines, for each pixel in the first video frame, a flow vector representing a displacement (motion) of the pixel between the first video frame and the second video frame. Each flow vector can be, e.g., a two-dimensional (2D) vector in the frame of reference of the video frames.

Each neural network described in this specification can have any appropriate architecture which enables the neural network to perform its described function. For example, each neural network can include any appropriate types of neural network layers (e.g., convolutional layers, fully-connected layers, attention layers, etc.) in any appropriate number (e.g., 5 layers, 10 layers, or 20 layers) and connected in any appropriate configuration (e.g., as a linear sequence of layers).

Throughout this specification, the first video frame in a sequence of video frames may be referred to as "I-frame," and video frames after the first video frame may be referred to as "P-frames." (In some cases, a single video may be partitioned into multiple sequences of video frames, such a single video can have multiple frames designated as being I-frames).

In one aspect there is described a method of compressing video performed by a data processing apparatus, comprising receiving a video sequence of frames. The method may involve processing the video sequence of frames to predict subsequent (P) frames from previous frames, in particular by processing, successively, two sequential frames of the video sequence. The two sequential frames comprise a first frame of the video sequence and a second frame of the video sequence that is subsequent the first frame.

Thus the method may involve generating, using a flow prediction network, an optical flow (more precisely optical flow data representing the optical flow) between two sequential frames, where the two sequential frames comprise a first frame and a second frame that is subsequent the first frame. The method may also involve generating from the optical flow, using a first autoencoder neural network, that acts as a flow encoding engine a predicted optical flow between the first frame and the second frame; and a confidence mask. In implementations the confidence mask defines a set of confidence values that has the same spatial dimensions as the predicted optical flow; for example it may have a confidence value (o) for each pixel of the predicted optical flow e.g. in the range $[0,\sigma\_maz.]$.

In implementations the first autoencoder neural network comprises an encoder network coupled to (followed by) a generator network. In implementations the encoder neural network processes the optical flow to generate a flow latent representing the optical flow. The generator network processes the flow latent to generate the predicted optical flow (a reconstruction of the optical flow). In implementations the flow latent may be quantized and entropy coded.

The method may involve warping a reconstruction of the first frame, e.g. from processing a previous two sequential frames, according to the predicted optical flow and subsequently applying a blurring operation according to the confidence mask to obtain an initial predicted reconstruction of the second frame.

Warping the reconstruction of the first frame may comprise applying the predicted optical flow to the reconstruction of the first frame. Applying the blurring operation according to the confidence mask may comprise applying the blurring operation to the warped reconstruction of the first frame, where the confidence value defined by the confidence mask at a spatial location defines a scale (size) of the blurring. For example a larger confidence value may define more blurring of a pixel at a spatial location.

The method may also involve generating, using a second autoencoder neural network, that acts as a residual encoding engine, a prediction of a residual (a current residual frame) that is a difference between the second frame and the initial predicted reconstruction of the second frame.

In implementations the second autoencoder neural network comprises an encoder network coupled to (followed by) a generator network.

In implementations the encoder neural network processes the current residual frame to generate a residual latent representing the current residual frame. The generator network processes the residual latent to generate a reconstruction of the prediction of the residual i.e. of the current residual frame, In implementations the residual latent may be quantized and entropy coded.

The method may combine the initial predicted reconstruction of the second frame and the prediction of the residual to obtain a predicted second frame (a predicted reconstruction of the current frame). This may be used as the reconstruction of the first frame when processing a successive two sequential frames of the video sequence.

The compressed video for two sequential frames of the video sequence may comprise the flow latent, optionally quantized and/or entropy coded, and the residual latent, optionally quantized and/or entropy coded. Thus the compressed video sequence of frames may comprise a succession of such flow latents and residual latents for successive sets of two sequential frames of the video sequence.

In some implementations, but not essentially, the generator network of the second autoencoder neural network is a component of a generative adversarial neural network (GANN). That is, it may have been trained using an adversarial loss, in particular with a value that depends on a discriminator score (generated by a discriminator neural network) that defines a likelihood a video frame was generated using the generator network of the second autoencoder.

In some implementations, but not essentially, a first frame of the video sequence may be encoded (separately), using an I-frame compression system, such as a third autoencoder neural network. For example an encoder network of the third autoencoder neural network may generate one or more latents representing the first video frame and a generator network of the third autoencoder neural network may generate a reconstruction of the first video frame. Again the one or more latents representing the first video frame may be quantized and entropy coded.

According to one aspect, there is provided a method of compressing video performed by a data processing apparatus, comprising: receiving a video sequence of frames; generating, using a flow prediction network, an optical flow between two sequential frames, wherein the two sequential frames comprise a first frame and a second frame that is subsequent the first frame; generating from the optical flow, using a first autoencoder neural network: a predicted optical flow between the first frame and the second frame; and a confidence mask; warping a reconstruction of the first frame according to the predicted optical flow and subsequently applying a blurring operation according the confidence mask to obtain an initial predicted reconstruction of the second frame; generating, using a second autoencoder neural network, a prediction of a residual that is a difference between the second frame and the initial predicted reconstruction of the second frame; combining the initial predicted reconstruction of the second frame and the prediction of the residual to obtain a predicted second frame; wherein: each of the first and second autoencoder neural networks respectively comprise an encoder network and a generator network; and the generator network of the second autoencoder neural network is a component of a generative adversarial neural network (GANN).

In some implementations: the first frame and the second frame are subsequent to a third frame, and wherein the third frame is an initial frame in the video sequence; and the method further comprises, prior to processing the second and third frames: generating from the third frame, using a third autoencoder neural network, a predicted reconstruction of the third frame; generating, using the flow prediction network, an optical flow between third frame and the first frame; generating from the optical flow, using the first autoencoder neural network: a predicted optical flow between the third frame and the first frame; and a confidence mask; warping the reconstruction of the third frame according to the predicted optical flow and subsequently applying a blurring operation according the confidence mask to obtain an initial predicted reconstruction of the first frame; generating, using the second autoencoder neural network, a prediction of a residual that is a difference between the first frame and the initial predicted reconstruction of the first frame; and combining the initial predicted reconstruction of the first frame and the prediction of the residual to obtain a predicted first frame; wherein: the third autoencoder neural network comprises an encoder network and a generator network; the third generator network of the third autoencoder neural network is a component of a generative adversarial neural network (GANN).

In some implementations, the method further comprises: encoding, using the second autoencoder neural network, a residual to obtain a residual latent; obtaining, using the third encoder neural network, a free latent by encoding the initial prediction of the second frame; and concatenating the free latent and the residual latent; wherein generating, using the second autoencoder neural network, the prediction of the residual comprises generating the predicted residual by the second autoencoder neural network using the concatenation of the free latent and the residual latent.

In some implementations, the method further comprises entropy encoding a quantization of the residual latent, wherein the entropy encoded quantization of the residual latent is included in compressed video data representing the video.

In some implementations, encoding the residual to obtain the residual latent comprises: processing the residual using the encoder neural network of the second autoencoder neural network to generate the residual latent.

In some implementations, obtaining the free latent by encoding the initial prediction of the second frame comprises: processing the initial prediction of the second frame using an encoder neural network to generate the free latent.

In some implementations, generating the prediction of the residual comprises: processing the concatenation of the free latent and the residual latent using the generator neural network of the second autoencoder neural network to generate the prediction of the residual.

In some implementations, combining the initial predicted reconstruction of the second frame and the prediction of the residual to obtain the predicted second frame comprises: generating the predicted second frame by summing the initial predicted reconstruction of the second frame and the prediction of the residual.

In some implementations, generating the predicted optical flow between the first frame and the second frame comprises: processing the optical flow generated by the flow prediction network using the encoder network of the first autoencoder network to generate a flow latent representing the optical flow; and processing a quantization of the flow latent using the generator neural network of the first autoencoder neural network to generate the predicted optical flow.

In some implementations, the method further comprises entropy encoding the quantization of the flow latent, wherein the entropy encoded quantization of the flow latent is included in compressed video data representing the video.

In some implementations, the first and second autoencoder neural networks have been trained on a set of training videos to optimize an objective function that includes an adversarial loss.

In some implementations, for one or more video frames of each training video, the adversarial loss is based on a discriminator score, wherein the discriminator score is generated by operations comprising: generating an input to a discriminator neural network, wherein the input comprises a reconstruction of the video frame that is generated using the first and second autoencoder neural networks; and providing the input to the discriminator neural network, wherein the discriminator neural network is configured to: receive an input comprising an input video frame; and process the input to generate an output discriminator score defining a likelihood that the video frame was generated using the first and second autoencoder neural networks.

According to another aspect, there is provided a method performed by one or more computers for decompressing a video, the method comprising: receiving a compressed representation of the video, wherein the compressed representation of the video defines, for each video frame after a first video frame in the video, a quantized flow latent that represents an optical flow between a preceding video frame and the video frame; and generating a reconstruction of each video frame in the video, comprising, for each video frame after the first video frame in the video: obtaining a reconstruction of a preceding video frame in the video; processing the quantized flow latent for the video frame using a flow generator neural network to generate an optical flow between the preceding video frame and the video frame; and generating the reconstruction of the video frame using: (i) the reconstruction of the preceding video frame, and (ii) the optical flow between the preceding video frame and the video frame.

In some implementations, generating the reconstruction of the video frame using: (i) the reconstruction of the preceding video frame, and (ii) the optical flow between the preceding video frame and the video frame, comprises: generating an initial reconstruction of the video frame by warping the reconstruction of the preceding video frame using the optical flow between the preceding video frame and the video frame; and generating the reconstruction of the video frame using the initial reconstruction of the video frame.

In some implementations, generating the reconstruction of the video frame using the initial reconstruction of the video frame comprises: generating a reconstruction of a residual video frame, wherein the residual video frame is defined by a difference between: (i) the video frame, and (ii) the initial reconstruction of the video frame; and generating the reconstruction of the video frame by combining reconstruction of the residual video frame with the initial reconstruction of the video frame.

In some implementations, the compressed representation of the video further comprises, for each video frame after the first video frame in the video, a quantized residual latent that represents a residual video frame; and wherein generating the reconstruction of the residual video frame comprises: processing the quantized residual latent for the video frame using a residual generator neural network to generate the reconstruction of the residual video frame.

In some implementations, the compressed representation of the video defines a latent representing the first video frame in the video; and generating the reconstruction of the first video frame comprises: processing the latent representing the first video frame using an I-frame generator neural network to generate the reconstruction of the first video frame.

According to another aspect, there is provided a computer storage medium encoded with a computer program, the program comprising instructions that when executed by data processing apparatus cause the data processing apparatus to perform operations of the methods described herein.

According to another aspect, there is provided a system, comprising: a data processing apparatus; and a computer storage medium encoded with a computer program, the program comprising instructions that when executed by the data processing apparatus cause the data processing apparatus to perform the operations of the methods described herein.

Particular embodiments of the subject matter described in this specification can be implemented so as to realize one or more of the following advantages.

The compression system described in this specification can generate compressed video data by generating optical flow data that defines optical flow between the video frames in the video. The compression system then compresses the optical flow data includes a compressed representation of the optical flow data in the compressed representation of the video. The optical flow data can, in some cases, be compressed more efficiently than the original video frames, e.g., because significant portions of the optical flow data may have constant values reflecting smooth and predictable motion between video frames. Therefore representing the video frames in terms of optical flow enables the video to be compressed more efficiently.

In addition to generating optical flow data representing optical flow between the video frames in the video, the compression system can further generate residual video frames corresponding to the video frames in the video. A residual video frame ("residual") corresponding to a video frame represents an error in a reconstruction of the video frame that is generated using the optical flow data. The compression system can compress the residual video frames and include compressed representations of the residual video frames in the compressed representation of the video. The residual video frames can, in some cases, be compressed more efficiently than the original video frames, e.g., because they may consist substantially of small values near zero. Therefore representing the video frames in terms of optical flow and residual video frames can enable the video to be compressed efficiently while enabling high-fidelity reconstruction of the video.

The compression system can include neural networks that are trained using an adversarial loss. The adversarial loss encourages the compression system to generate compressed video data that can be reconstructed to generate realistic video data, e.g., that is free of unnatural artifacts that frequently result from decompressing video data using conventional systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a compression system for compressing video data, a decompression for decompressing video data, and a training system for training neural networks included in the compression system and the decompression system. The compression system is described in more detail with reference to FIG. 1-3, the decompression system is described in more detail with reference to FIG. 4-6, and the training system is described in more detail with reference to FIG. 7.

Figure 1:
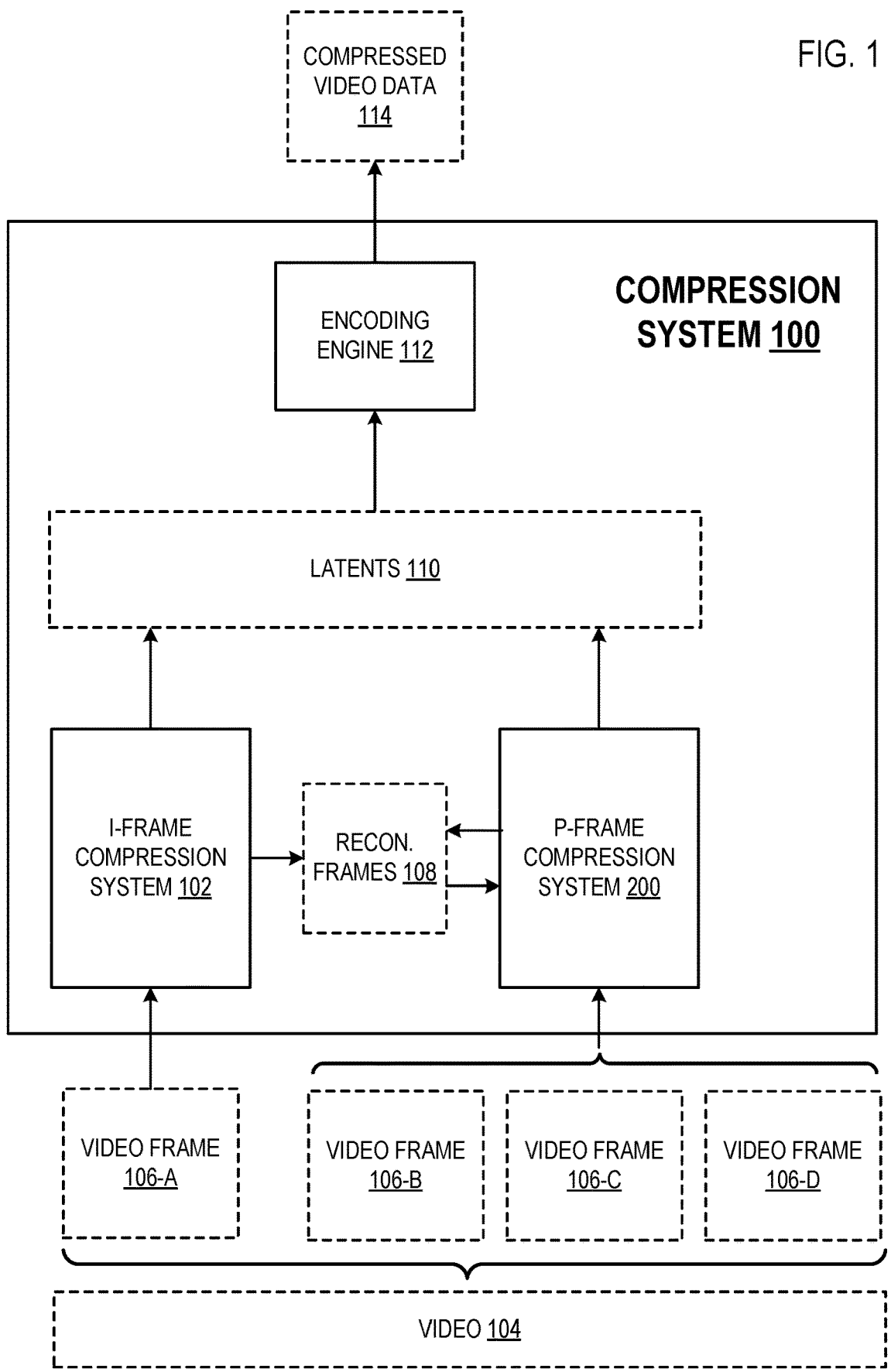
FIG. 1 shows an example compression system.

FIG. 1 shows an example compression system 100. The compression system 100 is an example of a system implemented as computer programs on one or more computers in one or more locations in which the systems, components, and techniques described below are implemented.

The compression system 100 is configured to receive a video 104 that includes a sequence of video frames 106, e.g., 106-A, 106-B, 106-C, 106-D, etc. The compression system 100 processes the video 104 to generate compressed video data 114, i.e., data that occupies less space in a memory than the original video (in some cases, by one or more orders of magnitude) and that enables (approximate or exact) reconstruction of the original video 104. (In some cases, the video 104 may be a proper subset of a larger video, e.g., the video 104 may be the first 1,000 frames of a larger video that includes over 100,000 frames).

The video can have any appropriate number of video frames, e.g., 10 video frames, 1,000 video frames, or 1,000,000 video frames. Each video frame in the video can be represented as an array of pixels, e.g., a two-dimensional (2D) array of pixels, where each pixel is represented by one or more numerical values, e.g., red-green-blue (RGB) values. The video can be obtained from any appropriate source. For example, the video can be provided by the compression system 100 by a user, e.g., by way of an application programming interface (API) made available by the compression system. As another example, the video can be read from a memory.

The compressed video data 114 generated by the compression system 100 can be decompressed by a decompression system to reconstruct the original video 104, as will be described in more detail below with reference to FIG. 4. After being generated, the compressed video data 114 can be, e.g., stored in a memory, transmitted over a data communications network (e.g., the internet), or used for any other appropriate purpose.

The compression system 100 generates the compressed video data 114 by sequentially compressing the video frames in the video, starting from the first video frame.

The compression system 100 includes an I-frame compression system 102, a P-frame compression system 200, and an encoding engine 112, which are each described next.

The I-frame compression system 102 processes the first video frame in the video 104 to generate: (i) one or more latents 110 representing the first video frame, and (ii) a reconstruction 108 of the first video frame. Example operations that can be performed by the I-frame compression system 102 are described in more detail below with reference to step 302 of FIG. 3.

For each video frame after the first video frame, the P-frame compression system generates an output that includes: (i) one or more latents 110 representing the current video frame, and (ii) a reconstructed version 108 of the current video frame. The P-frame compression system 200 generates the output by processing: (i) the current video frame, (ii) a preceding video frame, and (iii) a reconstruction of the preceding video frame. An example of a P-frame compression system 200 is described in more detail below with reference to FIG. 2.

The encoding engine 112 is configured to process the respective latents 110 generated by the I-frame compression system 102 (e.g. for a first frame in the video) and the P-frame compression system 200 for each (subsequent) video frame 106 to generate encoded representations of the latents 110. The encoding engine 112 can generate encoded representations of the latents 110 using an encoding technique such as an entropy encoding technique, e.g., Huffman coding or arithmetic coding. The encoded representations of the latents 110 form part or all of the compressed video data 114. The compressed video data 114 can be represented in any appropriate numerical format, e.g., as a bit stream, i.e., as a sequence of bits.

Figure 2:
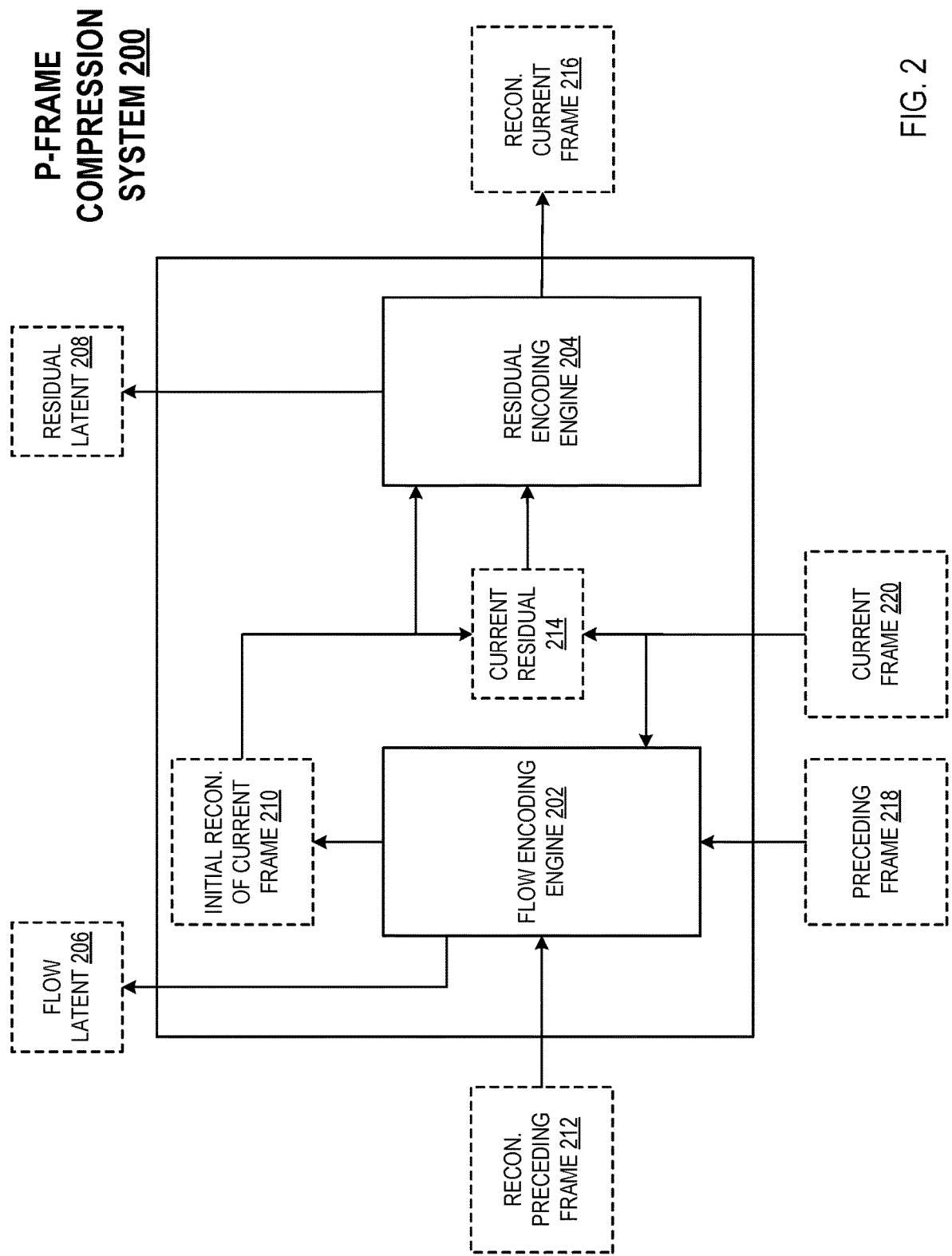
FIG. 2 shows an example P-frame compression system.

FIG. 2 shows an example P-frame compression system 200. The P-frame compression system 200 is an example of a system implemented as computer programs on one or more computers in one or more locations in which the systems, components, and techniques described below are implemented.

For each video frame after the first video frame in the video, the P-frame compression system 200 is configured to receive an input that includes: (i) a current video frame 220, (ii) a preceding video frame 218, and (iii) a reconstruction 212 of the preceding video frame.

The current video frame 220 and the preceding video frame 212 are extracted from the original video.

The reconstruction 212 of the preceding video frame is obtained as a previous output of either the I-frame compression system 102 of the P-frame compression system 200. More specifically, if the current video frame 220 is the second video frame in the video, then the reconstruction 212 of the preceding video frame is obtained as a previous output of the I-frame compression system. If the current video frame 220 is after the second video frame in the video, then the reconstruction 212 of the preceding video frame is obtained as a previous output of the P-frame compression system 200.

The P-frame compression system 200 processes the input to generate: (i) latents representing the current video frame 220, including a flow latent 206 and a residual latent 208, and (ii) a reconstruction 216 of the current video frame. The latents representing the current video frame are encoded (e.g., entropy encoded) and form part of the compressed video data, as described with reference to FIG. 1. The reconstruction 216 of the current video frame is subsequently provided as an input to the P-frame compression system 200 for use in generating the latents representing the next video frame and the reconstruction of the next video frame.

The P-frame compression system includes a flow encoding engine 202 and a residual encoding engine 112, which are each described next.

The flow encoding engine 202 generates optical flow data that defines an optical flow between the preceding video frame 218 and the current video frame 220. The flow encoding engine 202 processes the optical flow data to generate a flow latent 206 representing the optical flow data. The flow encoding engine 202 further processes the flow latent 206 to generate a reconstruction of the optical flow data ("predicted optical flow"), and warps the reconstruction 212 of the preceding video frame using the reconstructed optical flow data to generate an initial reconstruction 210 ("initial predicted reconstruction") of the current frame.

Example operations that can be performed by the flow encoding engine 202, e.g., to generate the flow latent 206 and the initial reconstruction 210 of the current frame, are described in more detail with reference to FIG. 3.

The residual encoding engine 112 generates a current residual frame as a difference between: (i) the initial reconstruction of the current frame 210, and (ii) the current frame 220. The residual encoding engine 112 processes the current residual frame 214 to generate a residual latent 208 representing the current residual frame 214. The residual encoding engine 112 further processes the residual latent to generate a reconstruction of the current residual frame 214 ("prediction of a residual"), and combines the reconstruction of the current residual frame 214 with the initial reconstruction 210 of the current frame to generate the reconstruction 216 ("predicted reconstruction") of the current frame; this may be referred to as a "predicted second frame".

Example operations that can be performed by the residual encoding engine 112, e.g., to generate the residual latent 208 and the reconstruction 216 of the current frame, are described in more detail with reference to FIG. 3.

The P-frame compression system 200 provides the flow latent 206 and the residual latent 208 to be encoded, e.g., entropy encoded, and included in the compressed video data representing the video. The P-frame compression system 200 provides the reconstruction 216 of the current frame for processing as part of generating the latents representing the next video frame.

Figure 3:
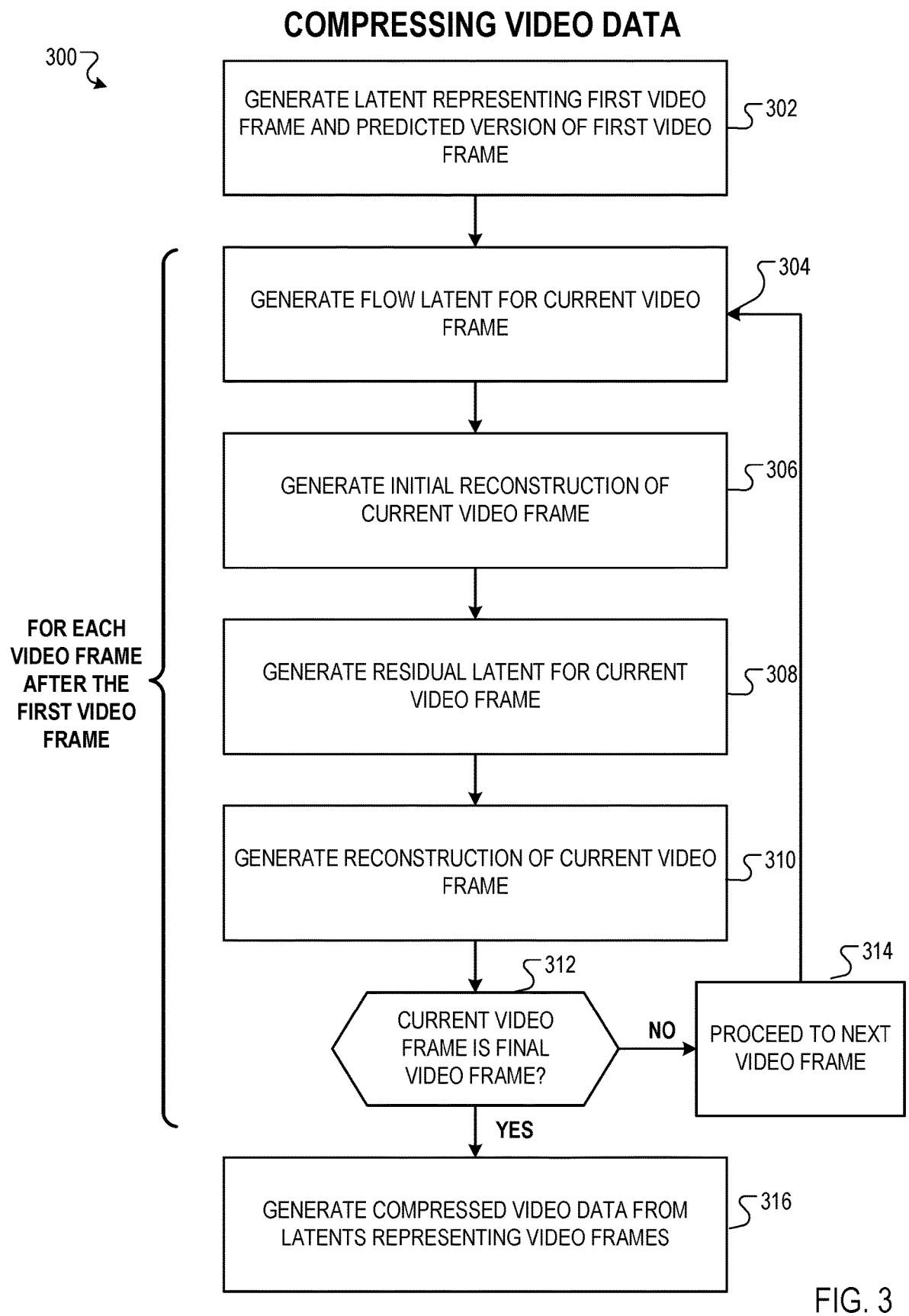
FIG. 3 is a flow diagram of an example process for compressing a video.

FIG. 3 is a flow diagram of an example process 300 for compressing a video. For convenience, the process 300 will be described as being performed by a system of one or more computers located in one or more locations. For example, a compression system, e.g., the compression system 100 of FIG. 1, appropriately programmed in accordance with this specification, can perform the process 300.

The system generates a latent representing the first video frame in the video and a reconstruction of the first video frame in the video (302). More specifically, the system processes the first video frame in the video using a neural network, referred to for convenience as an I-frame encoder neural network, to generate the latent representing the first video frame in the video. The system quantizes the latent representing the first video frame, in particular, by quantizing each numerical value in the latent representing the first video frame. The system then processes the (quantized) latent representing the first video frame using a neural network, referred to for convenience as an I-frame generator neural network, to generate the reconstruction of the first video frame in the video. (The I-frame encoder neural network and the I-frame generator neural network can be understood as collectively defining an autoencoder neural network).

The system sequentially performs steps 304-312 for each video frame in the video, starting from the second video frame. For convenience, steps 304-312 will be described as being performed with reference to a "current" video frame in the video.

The system generates a flow latent for the current video frame (304). More specifically, to generate the flow latent, the system generates optical flow data that defines an optical flow between the preceding video frame and the current video frame in the video. The system can generate the optical flow data using any of a variety of techniques. For example, the system can process the preceding video frame and the current video frame using a neural network, referred to for convenience as a flow prediction neural network, that is configured through training to generate an output that defines an optical flow between the preceding video frame and the current video frame. An example of a flow prediction neural network is described with reference to Rico Jonschkowski et al., "What matters in unsupervised optical flow," arXiv:2006.04902, 1(2):3, 2020. As another example, the system can generate an optical flow between the preceding video frame and the current video frame using the Lucas-Kanade method.

After generating the optical flow between the preceding video frame and the current video frame, the system processes the data defining the optical flow using a neural network, referred to for convenience as a flow encoder neural network, to generate the flow latent for the current video frame. The system also quantizes the flow latent representing the optical flow, in particular, by quantizing each numerical value in the flow latent.

The system generates an initial reconstruction of the current video frame using the (quantized) flow latent (306). More specifically, the system processes the flow latent using a neural network, referred to for convenience as a flow generator neural network, to generate a reconstruction of the optical flow between the preceding video frame and the current video frame. (The flow encoder neural network and the flow generator neural network can be understood as collectively defining an autoencoder neural network). In some implementations, in addition to generating the reconstructed optical flow, the flow generator neural network further generates a confidence mask. The confidence mask includes a respective value, referred to for convenience as a confidence value, for each pixel in the preceding video frame. Intuitively, for each pixel, the confidence value for the pixel can characterize the accuracy of the reconstructed optical flow in the vicinity of the pixel.

The system obtains a reconstruction of the preceding video frame, e.g., that was previously generated by the system, and warps the reconstruction of the preceding video frame according to the reconstructed optical flow to generate the initial reconstruction of the current video frame. Optionally, as part of generating the initial reconstruction of the current video frame, the system can apply a blurring operation according to the confidence mask. The amount of blurring to be applied to each pixel in the initial reconstruction of the current video frame is defined by the confidence value for the pixel.

The system can warp the reconstruction of the preceding video frame according to the reconstructed optical flow using any appropriate warping technique. For example, the system can generate the initial reconstruction of the current video frame as:

$$x' = AB(\text{Warp}(x, \hat{F}), \sigma) \quad (1)$$

where x' is the initial reconstruction of the current video frame, x is the reconstruction of the preceding video frame, $\hat{F}$ is the reconstructed optical flow, σ is the confidence mask, Warp (•) is a bi-linear or tri-linear warping operation (e.g., as described with reference to E. Agustsson et al., "Scale-space flow for end-to-end optimized video compression," *Proceedings of the IEEE Conference on Computer Vision and Pattern Recognition*, pages 8503-8512, 2020), and AB(•,σ) defines a scale-space blurring operation according to the confidence mask σ (i.e. a blurring operation where σ defines a blurring scale).

The system generates a residual latent for the current video frame (308). More specifically, to generate the residual latent, the system generates a residual video frame as a difference (i.e., an error) between: (i) the current video frame, and (ii) the initial reconstruction of the current video frame. For example, the system can generate the residual video frame by subtracting the current video frame from the initial reconstruction of the current video frame. The system then processes the residual video frame using a neural network, referred to for convenience as a residual encoder neural network, to generate the residual latent. The system quantizes the residual latent, in particular, by quantizing each numerical value in the residual latent.

The system generates a reconstruction of the current video frame (310). More specifically, to generate the reconstruction of the current video frame, the system processes an input that includes the (quantized) residual latent for the current video frame using a neural network, referred to for convenience as a residual generator neural network, to generate a reconstruction of the residual video frame. (The residual encoder neural network and the residual generator neural network can be understood as collectively defining an autoencoder neural network).

In some implementations, the system generates a latent, referred to for convenience as a "free" latent, that represents the initial reconstruction of the current video frame. For example, the system can process the initial reconstruction of the current video frame using an encoder neural network (e.g., the I-frame encoder neural network) to generate the free latent. The system can then include both: (i) the quantized residual latent, and (ii) the free latent, in the input processed by the residual generator neural network to generate the reconstruction of the residual video frame. For instance, the system can concatenate the quantized residual latent and the free latent, and then provide the concatenation as an input to the residual generator neural network. Additionally feeding in the free latent extracted from the initial reconstruction of the current video frame can significantly increase the amount of detail synthesized in the residual video frame due to the additional information and context provided by the free latent. Moreover, the free latent does not need to be encoded into the compressed video data because the decompression system can directly compute the free latent from the initial reconstruction of the current video frame (hence the latent is "free").

After generating the reconstructed residual video frame, the system can generate the reconstruction of the current video frame by combining (e.g., summing): (i) the reconstructed residual video frame, and (ii) the initial reconstruction of the current video frame. Thus, the reconstructed residual video frame can be understood as correcting any errors in the initial reconstruction of the current video frame generated by warping the reconstruction of the preceding video frame. If the current video frame is not the last video frame, the system subsequently uses the reconstruction of the current video frame to generate the initial reconstruction of the next video frame, e.g., as described at step 306.

The system determines if the current video frame is the final video frame in the video (312).

In response to determining that the current video frame is not the final video frame in the video, the system proceeds to the next video frame and returns to step 304.

In response to determining that the current video frame is the final video frame, the system generates the compressed video data representing the video from at least the quantized latents representing the video frames (316). More specifically, the system generates the compressed video data from at least: (i) the quantized latent representing the first video frame, and (ii) the respective quantized flow latent and quantized residual latent for each video frame after the first video frame in the video.

For example, the system can compress the quantized latents representing the video frames using an entropy encoding technique, e.g., Huffman coding or arithmetic coding. The system can compress the quantized latents using a predefined probability distribution over the set of possible quantized numerical values, or using an adaptive probability distribution determined based on the quantized latents. Example techniques for determining an adaptive probability distribution for entropy encoding are described with reference to D. Minnen et al., "Joint autoregressive and hierarchical priors for learned image compression," *Advances in Neural Information Processing Systems*, pages 10771-10780, 2018. The entropy encoded representations of the quantized latents representing the video frames collectively form part or all of the compressed video data representing the video.

Figure 4:
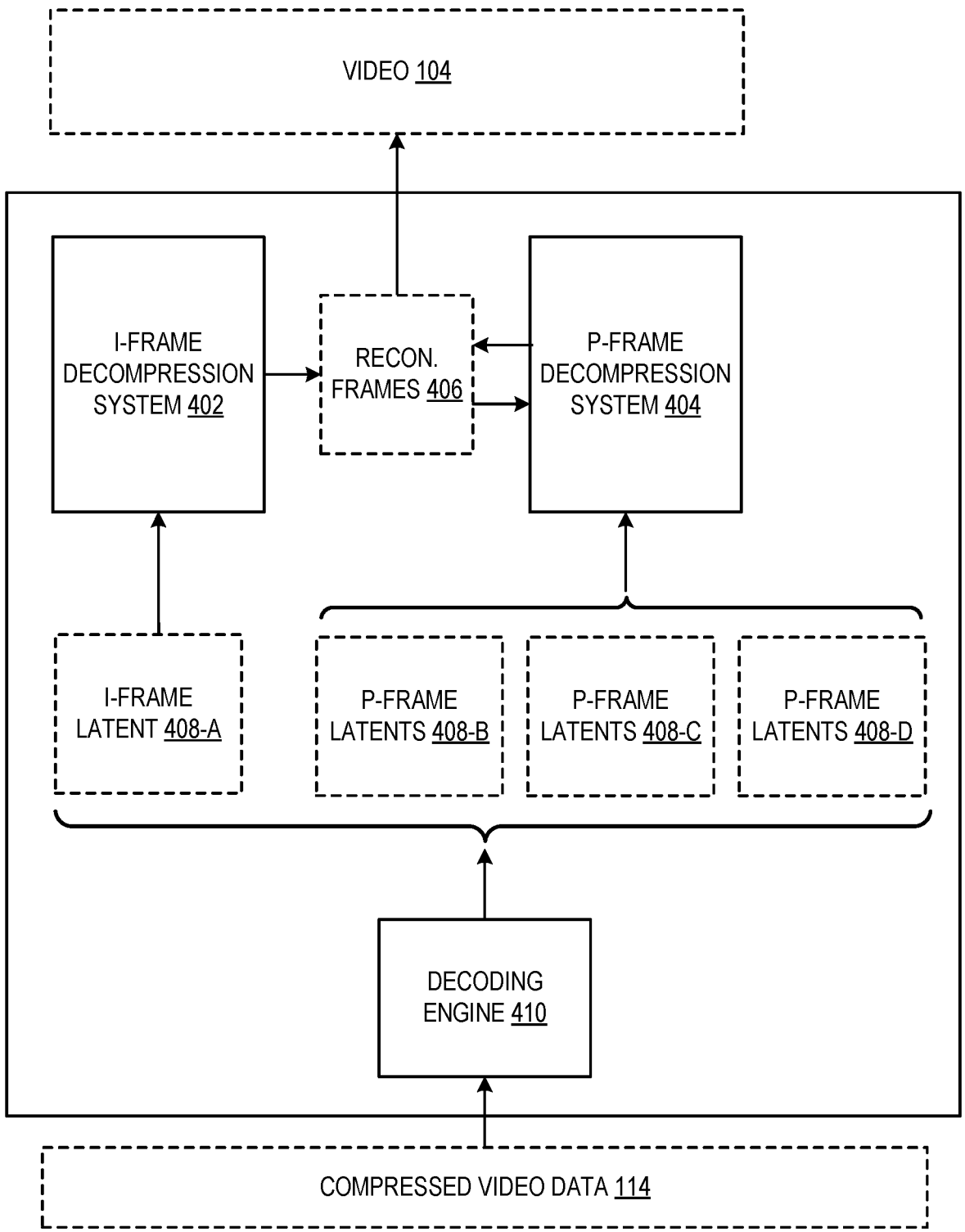
FIG. 4 shows an example decompression compression system.

FIG. 4 shows an example decompression system 400. The decompression system 400 is an example of a system implemented as computer programs on one or more computers in one or more locations in which the systems, components, and techniques described below are implemented.

The decompression system 400 is configured to process compressed video data 114 generated by the compression system 100 to reconstruct the original video 104 represented by the compressed video data 114. The compressed video data 114 includes encoded (e.g., entropy encoded) quantized latents for each video frame in the video, as described above with reference to FIG. 3.

The decompression system 400 includes a decoding engine 410, an I-frame decompression system 402, and a P-frame decompression system 404, which are each described next.

The decoding engine 410 is configured to entropy decode the compressed video data 114 to generate a decoded representation of the quantized latents for each video frame in the video. In particular, the decoding engine 410 generates an I-frame latent 408-A representing the first frame in the video and respective P-frame latents 408-B-D representing each video frame after the first video frame in the video. The P-frame latents 408-B-D for a video frame include a flow latent and a residual latent, as described above with reference to FIG. 3.

The I-frame decompression system 400 is configured to process the I-frame latent 408-A to generate a reconstruction 406 of the first video frame in the video. Example operations that can be performed by the I-frame decompression system 400 to generate the reconstruction of the first video frame are described in more detail in FIG. 6.

For each video frame after the first video frame in the video, the P-frame decompression system 400 is configured to process: (i) a reconstruction 406 of the preceding video frame, and (ii) the P-frame latents 408-B-D for the current video frame, to generate a reconstruction 406 of the current video frame. An example of a P-frame decompression system 400 is described in more detail with reference to FIG. 5.

The reconstructions 406 of the video frames of the video collectively define the original video 104.

Figure 5:
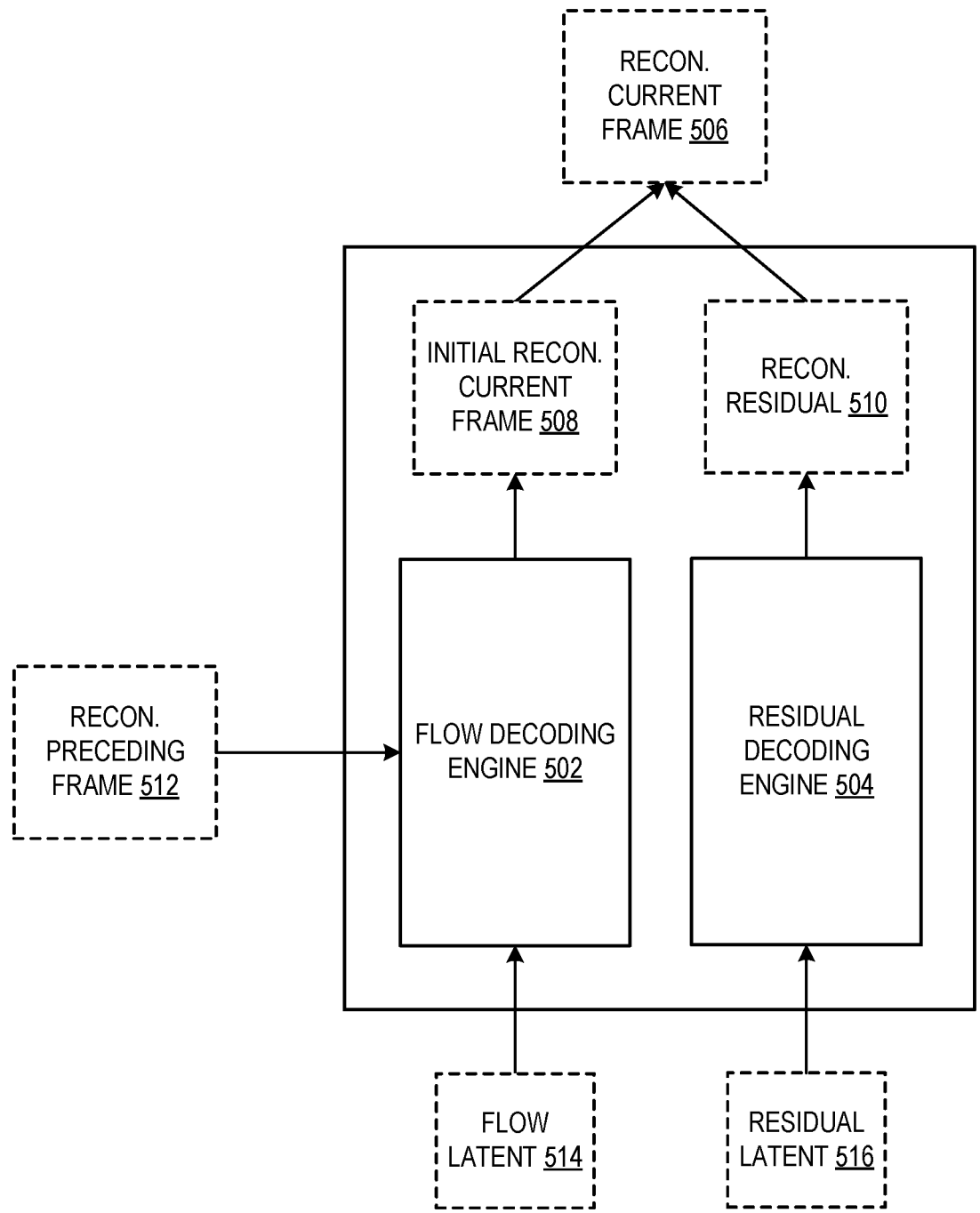
FIG. 5 shows an example P-frame decompression system.

FIG. 5 shows an example P-frame decompression system 400. The P-frame decompression system 400 is an example of a system implemented as computer programs on one or more computers in one or more locations in which the systems, components, and techniques described below are implemented.

The P-frame decompression system is configured to generate a reconstruction 506 of a current video frame in the video by processing: (i) a reconstruction of the preceding video frame 512, and (ii) a flow latent 514 and a residual latent 516 for the current video frame.

The reconstruction of the preceding video frame is obtained as a previous output of the I-frame decompression system or the P-frame decompression system. More specifically, if the current video frame is the second video frame in the video, then the reconstruction of the preceding video frame 512 is obtained as the output of the I-frame decompression system. If the current video frame is after the second video frame in the video, then the reconstruction of the preceding video frame 512 is obtained a previous output of the P-frame decompression system.

The P-frame decompression system includes a flow decoding engine 502 and a residual decoding engine 504, which are each described next.

The flow decoding engine 502 is configured to process the reconstruction of the preceding video frame 512 and the flow latent 514 to generate an initial reconstruction of the current video frame 508. More specifically, the flow decoding engine 502 processes the flow latent to generate a reconstruction of an optical flow between the preceding video frame and the current video frame. The flow decoding engine 502 then warps the reconstruction of the preceding video frame according to the optical flow to generate the initial reconstruction of the current video frame 508.

The residual decoding engine 504 is configured to process the residual latent 516 to generate a reconstruction of a residual video frame 510.

The P-frame decompression system then combines, e.g., sums, the initial reconstruction of the current video frame 508 with the reconstruction of the residual video frame 510 to generate the reconstruction of the current video frame 506.

Figure 6:
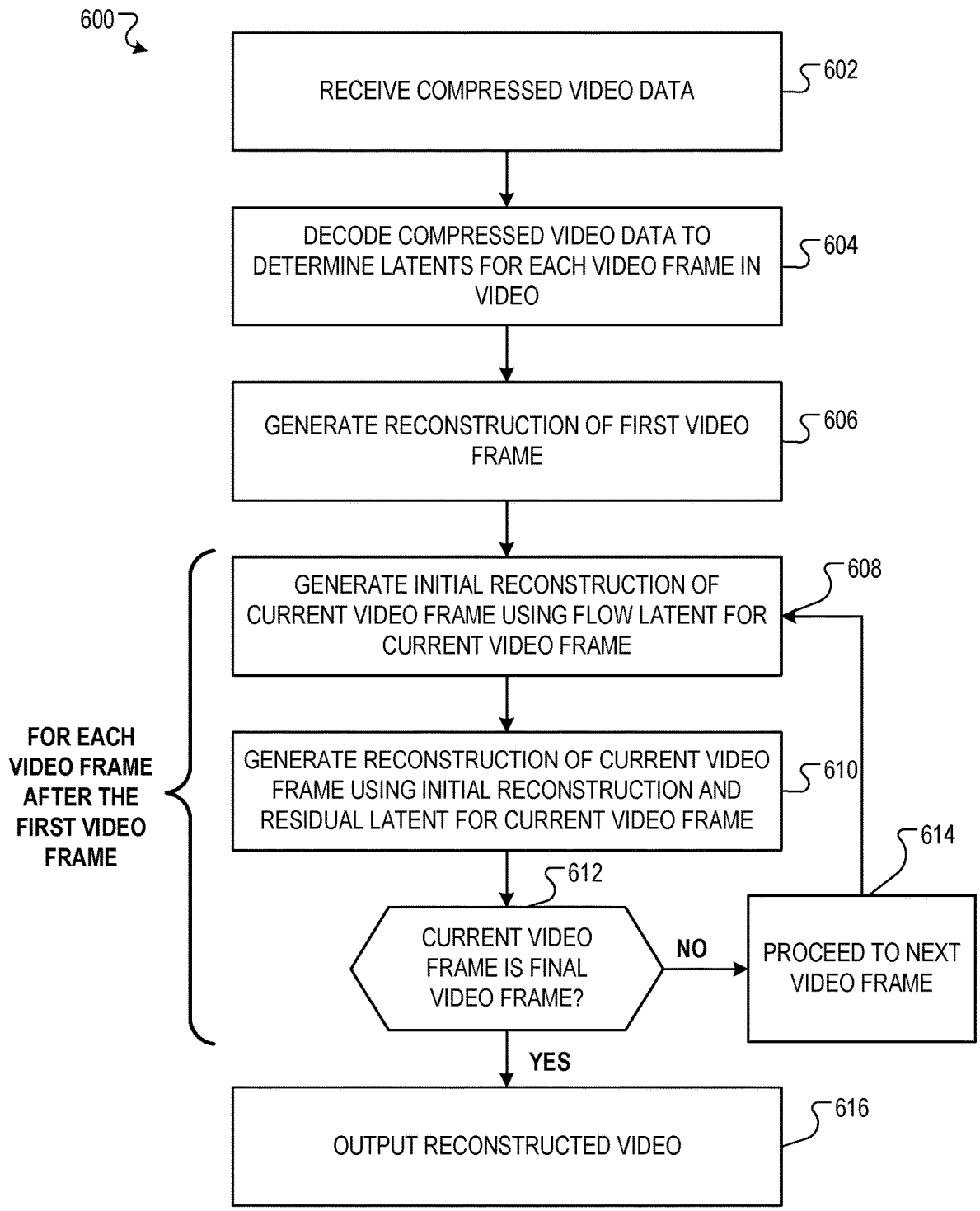
FIG. 6 is a flow diagram of an example process for decompressing a video.

FIG. 6 is a flow diagram of an example process 600 for decompressing a video. For convenience, the process 600 will be described as being performed by a system of one or more computers located in one or more locations. For example, a decompression system, e.g., the decompression system 400 of FIG. 4, appropriately programmed in accordance with this specification, can perform the process 600.

The system receives compressed video data representing a video (602). The compressed video data can be received, e.g., over a data communications network, or retrieved, e.g., from a memory. The compressed video data is generated by the compression system, e.g., as described with reference to FIG. 3. The compressed video data includes, for each video frame in the video, one or more encoded (e.g., entropy encoded) quantized latents representing the video frame.

The system decodes the compressed video data to recover, for each video frame in the video, one or more quantized latents representing the video frame (604). The system can decode the quantized latents representing the video frames, e.g., using any appropriate entropy decoding technique. For each video frame after the first video frame, the system decodes: (i) a quantized flow latent, and (ii) a quantized residual latent, for the video frame.

The system generates a reconstruction of the first video frame in the video (606). More specifically, the system processes a quantized latent representing the first video frame using an I-frame generator neural network. The I-frame generator neural network shares the same parameter values as the I-frame generator neural network implemented by the compression system, e.g., as described with reference to step 302 of FIG. 3.

The system performs steps 608-612 for each video frame after the first video frame in the video. For convenience, steps 608-612 are described with reference to a "current" video frame.

The system generates an initial reconstruction of the current video frame using a quantized flow latent for the current video frame (608). More specifically, the system processes the quantized flow latent using a flow generator neural network to generate a reconstruction of an optical flow between the preceding video frame and the current video frame. The flow generator neural network shares the same parameter values as the flow generator neural network implemented by the compression system, e.g., as described with reference to step 306 of FIG. 3. The system then warps a reconstruction of the preceding video frame using the reconstructed optical flow to generate the initial reconstruction of the current video frame.

The system generates a reconstruction of the current video frame using the initial reconstruction of the current video frame and the residual latent for the current video frame (610). More specifically, the system processes an input that includes the quantized residual latent for the current video frame using a residual generator neural network to generate a reconstruction of a residual video frame. The residual generator neural network shares the same parameter values as the residual generator neural network implemented by the compression system, e.g., as described with reference to step 310 of FIG. 3. In some implementations, the input to the residual generator neural network further includes a free latent that represents the initial reconstruction of the current video frame. The system can generate the free latent, e.g., by processing the initial reconstruction of the current video frame using an encoder neural network, e.g., the I-frame encoder neural network described with reference to step 302 of FIG. 3.

After generating the reconstruction of the residual video frame, the system generates the reconstruction of the current video frame using: (i) the residual video frame, and (ii) the initial reconstruction of the current video frame. For example, the system can generate the reconstruction of the current video frame as a sum of the residual video frame and the initial reconstruction of the current video frame.

The system determines if the current video frame is the final video frame in the video (612).

If the current video frame is not the final video frame in the video, the system proceeds to the next video frame (614) and returns to step 608.

If the current video frame is the final video frame in the video, the system outputs the reconstructed video, i.e., including the reconstruction of each video frame of the video.

Figure 7:
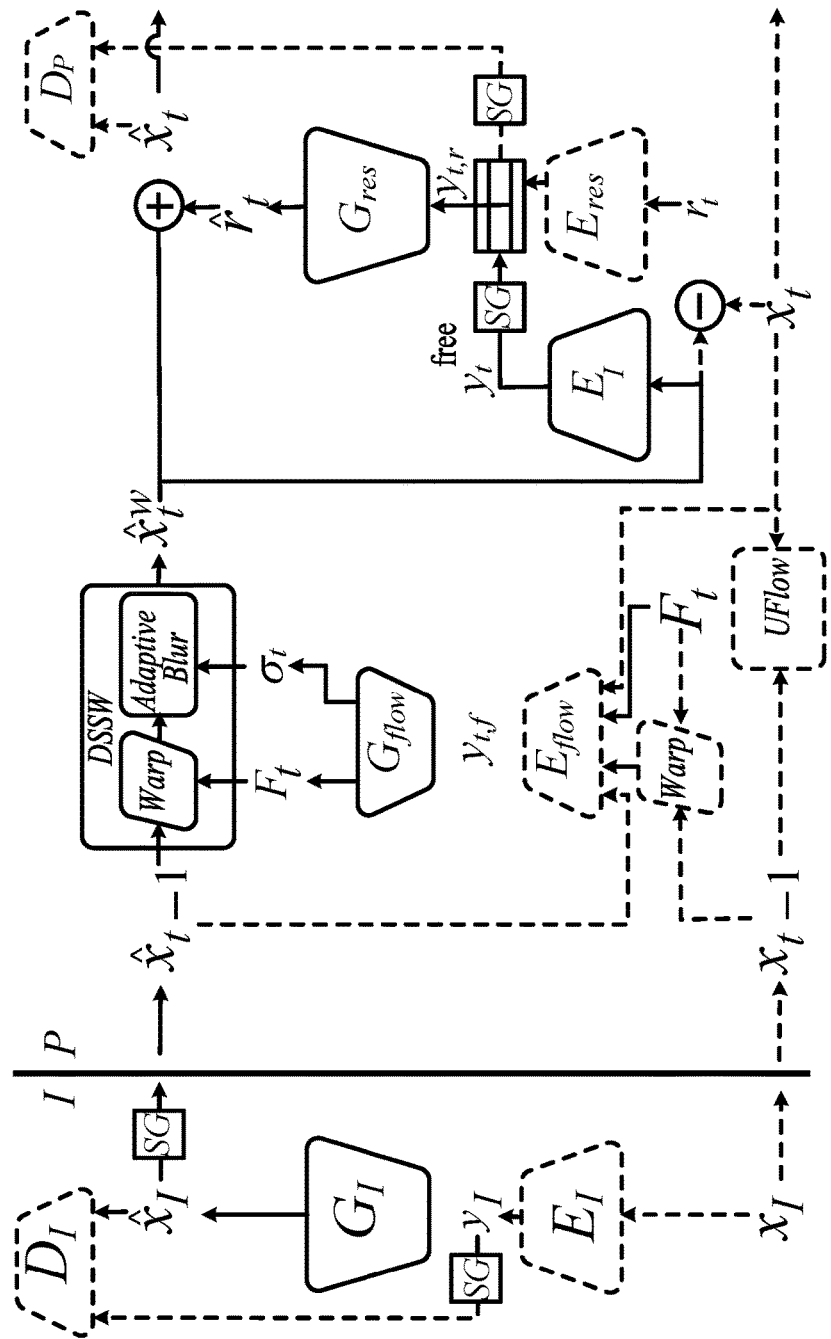
FIG. 7 shows an example training system.

FIG. 7 shows an example training system 700. The training system 700 is an example of a system implemented as computer programs on one or more computers in one or more locations in which the systems, components, and techniques described below are implemented.

The training system is configured to train the neural networks included in the compression system and decompression system, on a set of training videos, to optimize an objective function.

More specifically, the training system trains: an I-frame encoder neural network $E_I$, an I-frame generator neural network $G_I$, a flow encoder neural network $E_{flow}$, a flow generator neural network $G_{flow}$, a residual encoder neural network $E_{res}$, and a residual generator neural network $G_{res}$. The operations performed by $E_I$, $G_I$, $E_{flow}$, $G_{flow}$, $E_{res}$, and $G_{res}$ are described above, e.g., with reference to FIG. 3 and FIG. 6; they may be implemented using convolutional neural networks, e.g. with a capacity indicated by their relative size in the figure. The training system jointly trains the neural networks included in the compression system and the decompression system along with an I-frame discriminator neural network $D_I$ and a P-frame discriminator neural network $D_P$, as will be described in more detail next. The paths indicated by dashed lines are not active during decoding; $D_I$ and $D_P$ are only active during training; SG indicates a stop gradient operation.

For each training the video, the training system can process the first video frame in the training video using the I-frame encoder neural network to generate a quantized latent $y_I$ representing the first video frame, and then process the quantized latent representing the first video frame using the I-frame generator neural network to generate a reconstruction $\hat{x}_I$ of the first video frame. The training system then processes the latent representing the first video frame and the reconstruction of the first video frame using the I-frame discriminator neural network to generate an I-frame discriminator score. The I-frame discriminator neural network is configured to process a latent representing a video frame and a video frame to generate an I-frame discriminator score that defines a likelihood that the input video frame was generated by the I-frame generator neural network.

The training system trains the I-frame encoder neural network and I-frame generator neural network to optimize an objective function, e.g., given by:

$$\mathcal{L}_{I-frame} = \lambda \cdot R(y_I) + d(x_I, \hat{x}_I) - \beta \log(D_I(\hat{x}_I, y_I)) \quad (2)$$

where $\lambda$ and $\beta$ are hyper-parameters, $d(x_I, \hat{x}_I)$ measures a distance (e.g., an $L_1$ or $L_2$ distance) between the first video frame and the reconstruction of the first video frame, and $D_I(\hat{x}_I, y_I)$ denote an I-frame discriminator score generated by the I-frame discriminator neural network by processing the reconstruction of the first video frame and the latent representing the first video frame, and $R(y_I)$ represents the number of bits (bitrate) required to store the latents representing the first video frame. A term in an objective function that depends on a discriminator score can be referred to as an adversarial loss term. (As a result of being trained using an objective function that includes an adversarial loss, the I-frame encoder neural network and the I-frame generator neural network can be understood as collectively defining a generative adversarial neural network).

The training system trains the I-frame discriminator neural network to optimize an objective function, e.g., given by:

$$\mathcal{L}_{D_I} = -\log(1 - D_I(\hat{x}_I, y_I)) - \log(D_I(x_I, y_I)) \quad (3)$$

where $D_I(\hat{x}_I, y_I)$ denotes an I-frame discriminator score generated by the I-frame discriminator neural network by processing the reconstruction of the first video frame and the latent representing the first video frame, and $D_I(x_I, y_I)$ denotes an I-frame discriminator score generated by the I-frame discriminator neural network by processing the first video frame and the latent representing the first video frame.

For each video frame after the first video frame, the training system generates an optical flow $F_t$ between the current video frame and the preceding video frame (e.g., using the flow prediction neural network UFlow), processes the optical flow data using the flow encoder neural network to generate a quantized flow latent $y_{t,f}$ representing the optical flow, and processes the quantized optical flow latent using the flow generator neural network to generate reconstructed optical flow data $\hat{F}_t$ and a confidence mask $\sigma_t$. The training system then processes a reconstruction $\hat{x}_{t-1}$ of the preceding video frame, the reconstructed optical flow data, and the confidence mask using a warping operation with adaptive blurring to generate an initial reconstruction $\hat{x}_t^w$ of the current video frame.

The training system generates a residual video frame $r_t$ as a difference between the initial reconstruction of the current video frame and the current video frame, generates a quantized residual latent by processing the residual video frame using the residual encoder neural network, and generates a reconstruction $\hat{r}_t$ of the residual video frame by processing an input including the residual latent using the residual generator neural network. Optionally, the training system can process the initial reconstruction of the current video frame using the I-frame encoder neural network to generate a free latent $y_t^{free}$ representing the initial reconstruction of the current video frame, and include the free latent in the input the residual generator neural network. The training system can generate a reconstruction $\hat{x}^t$ of the current video frame by summing the initial reconstruction of the current video frame and the reconstruction of the residual video frame.

The training system then processes the reconstruction of the current video frame and the input to the residual generator neural network using the P-frame discriminator neural network $D_P$ to generate a P-frame discriminator score. The P-frame discriminator neural network is configured to process an input including a video frame to generate a P-frame discriminator score that defines a likelihood that the input video frame was generated using the flow generator neural network and the residual generator neural network. In some implementations both the I-frame discriminator neural network and the P-frame discriminator neural network may use spectral normalization.

The training system trains the flow encoder neural network, the flow generator neural network, the residual encoder neural network, and the residual generator neural network to optimize an objective function, e.g., given by:

$$\mathcal{L}_{P-frame} = \sum_{t=2}^{T} \lambda \cdot R(y_{t,r}) + t \cdot d(x_t, \hat{x}_t) - t \cdot \beta \cdot \log(D_P(\hat{x}_t, y_{t,r})) + \mathcal{L}_{reg} \quad (4)$$

$$\mathcal{L}_{reg} = k_{flow} \cdot SG(\sigma_t) \cdot L_2(F_t, \hat{F}_t) + k_{TV} TV(\sigma_t) \quad (5)$$

where t indexes the video frames from the second video frame to the last video frame, T is the number of video frames, $\lambda$, $\beta$, $k_{flow}$, and $k_{TV}$ are hyper-parameters, $d(x_t, \hat{x}_t)$ represents an error between the t-video frame $x_t$ and the reconstruction $\hat{x}_t$ of the t-th video frame, $D_P(\hat{x}_t, y_{t,r})$ represents a P-frame discriminator score generated by the P-frame discriminator neural network by processing the reconstruction of the t-th video frame and the input to the residual generator neural network for the t-th video frame, $SG(\sigma_t)$ represents a stop-gradient operation acting on the confidence mask $\sigma_t$ for the t-th video frame, $L_2(F_t, \hat{F}_t)$ represents an $L_2$ error between the optical flow for the t-th video frame and the reconstructed optical flow for the t-th video frame, and $TV(\sigma_t)$ represents a total variation of $\sigma_t$, and $R(y_{t,r})$ represents the number of bits (bit rate) required to store the latents representing video frame $x_t$. A term in an objective function that depends on a discriminator score can be referred to as an adversarial loss term. (As a result of being trained using an objective function that includes an adversarial loss, the residual encoder neural network and the residual generator neural network can be understood as collectively defining a generative adversarial neural network).

The training system trains the P-frame discriminator neural network to optimize an objective function, e.g., given by:

$$\mathcal{L}_{Dp} = \sum_{t=2}^{T} -t \cdot \log(1 - D_P(\hat{x}_t, y_{t,r})) - t \cdot \log(D_P(x_t, y_{t,r})) \quad (6)$$

where t indexes the video frames from the second video frame to the last video frame, T is the number of video frames, $D_P(\hat{x}_t, y_{t,r})$ is a P-frame discriminator score generated by processing the reconstruction $\hat{x}_t$ of the t-th video frame and the input $y_{t,r}$ to the residual generator neural network using the P-frame discriminator neural network, and $D_P(x_t, y_{t,r})$ is a P-frame discriminator score generated by processing the t-th video frame $x_t$ and the input $y_{t,r}$ to the residual generator neural network using the P-frame discriminator neural network.

The training system can pre-train flow prediction neural network UFlow to perform optical flow prediction, and optionally, can freeze the parameter values of the flow prediction neural network during training of the other neural networks included in the compression and decompression systems.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A method of compressing video performed by a data processing apparatus, comprising:
   receiving a video sequence of frames;
   generating, using a flow prediction network, an optical flow between two sequential frames, wherein the two sequential frames comprise a first frame and a second frame that is subsequent the first frame;
   generating from the optical flow, using a first autoencoder neural network:
      a predicted optical flow between the first frame and the second frame; and
      a confidence mask that comprises a plurality of confidence values characterizing uncertainty in the predicted optical flow between the first frame and the second frame;
   warping a reconstruction of the first frame according to the predicted optical flow and subsequently applying a blurring operation according the confidence mask to obtain an initial predicted reconstruction of the second frame;

generating, using a second autoencoder neural network, a prediction of a residual that is a difference between the second frame and the initial predicted reconstruction of the second frame;
combining the initial predicted reconstruction of the second frame and the prediction of the residual to obtain a predicted second frame;
wherein:
each of the first and second autoencoder neural networks respectively comprise an encoder network and a generator network; and
the generator network of the second autoencoder neural network is a component of a generative adversarial neural network (GANN).

2. The method of claim 1, wherein:
the first frame and the second frame are subsequent to a third frame, and wherein the third frame is an initial frame in the video sequence; and
further comprising, prior to processing the second and third frames:
generating from the third frame, using a third autoencoder neural network, a predicted reconstruction of the third frame;
generating, using the flow prediction network, an optical flow between third frame and the first frame;
generating from the optical flow, using the first autoencoder neural network:
a predicted optical flow between the third frame and the first frame; and
a confidence mask;
warping the reconstruction of the third frame according to the predicted optical flow and subsequently applying a blurring operation according the confidence mask to obtain an initial predicted reconstruction of the first frame;
generating, using the second autoencoder neural network, a prediction of a residual that is a difference between the first frame and the initial predicted reconstruction of the first frame; and
combining the initial predicted reconstruction of the first frame and the prediction of the residual to obtain a predicted first frame;
wherein:
the third autoencoder neural network comprises an encoder network and a generator network;
the third generator network of the third autoencoder neural network is a component of a generative adversarial neural network (GANN).

3. The method of claim 1, further comprising:
encoding, using the second autoencoder neural network, a residual to obtain a residual latent;
obtaining, using the third encoder neural network, a free latent by encoding the initial prediction of the second frame; and
concatenating the free latent and the residual latent;
wherein generating, using the second autoencoder neural network, the prediction of the residual comprises generating the predicted residual by the second autoencoder neural network using the concatenation of the free latent and the residual latent.

4. The method of claim 3, further comprising entropy encoding a quantization of the residual latent, wherein the entropy encoded quantization of the residual latent is included in compressed video data representing the video.

5. The method of claim 3, wherein encoding the residual to obtain the residual latent comprises:
processing the residual using the encoder neural network of the second autoencoder neural network to generate the residual latent.

6. The method of claim 3, wherein obtaining the free latent by encoding the initial prediction of the second frame comprises:
processing the initial prediction of the second frame using an encoder neural network to generate the free latent.

7. The method of claim 3, wherein generating the prediction of the residual comprises:
processing the concatenation of the free latent and the residual latent using the generator neural network of the second autoencoder neural network to generate the prediction of the residual.

8. The method of claim 1, wherein combining the initial predicted reconstruction of the second frame and the prediction of the residual to obtain the predicted second frame comprises:
generating the predicted second frame by summing the initial predicted reconstruction of the second frame and the prediction of the residual.

9. The method of claim 1, wherein generating the predicted optical flow between the first frame and the second frame comprises:
processing the optical flow generated by the flow prediction network using the encoder network of the first autoencoder network to generate a flow latent representing the optical flow; and
processing a quantization of the flow latent using the generator neural network of the first autoencoder neural network to generate the predicted optical flow.

10. The method of claim 9, further comprising entropy encoding the quantization of the flow latent, wherein the entropy encoded quantization of the flow latent is included in compressed video data representing the video.

11. The method of claim 1, wherein the first and second autoencoder neural networks have been trained on a set of training videos to optimize an objective function that includes an adversarial loss.

12. The method of claim 11, wherein for one or more video frames of each training video, the adversarial loss is based on a discriminator score, wherein the discriminator score is generated by operations comprising:
generating an input to a discriminator neural network, wherein the input comprises a reconstruction of the video frame that is generated using the first and second autoencoder neural networks; and
providing the input to the discriminator neural network, wherein the discriminator neural network is configured to:
receive an input comprising an input video frame; and
process the input to generate an output discriminator score defining a likelihood that the video frame was generated using the first and second autoencoder neural networks.

13. A non-transitory computer storage medium encoded with a computer program, the program comprising instructions that when executed by data processing apparatus cause the data processing apparatus to perform operations for compressing video, the operations comprising:
receiving a video sequence of frames;
generating, using a flow prediction network, an optical flow between two sequential frames, wherein the two sequential frames comprise a first frame and a second frame that is subsequent the first frame;
generating from the optical flow, using a first autoencoder neural network:

a predicted optical flow between the first frame and the second frame; and a confidence mask that comprises a plurality of confidence values characterizing uncertainty in the predicted optical flow between the first frame and the second frame;

warping a reconstruction of the first frame according to the predicted optical flow and subsequently applying a blurring operation according the confidence mask to obtain an initial predicted reconstruction of the second frame;

generating, using a second autoencoder neural network, a prediction of a residual that is a difference between the second frame and the initial predicted reconstruction of the second frame;

combining the initial predicted reconstruction of the second frame and the prediction of the residual to obtain a predicted second frame;

wherein:
 each of the first and second autoencoder neural networks respectively comprise an encoder network and a generator network; and
 the generator network of the second autoencoder neural network is a component of a generative adversarial neural network (GANN).

14. A system, comprising:
a data processing apparatus; and
a computer storage medium encoded with a computer program, the program comprising instructions that when executed by the data processing apparatus cause the data processing apparatus to perform operations for compressing video, the operations comprising:
receiving a video sequence of frames;

generating, using a flow prediction network, an optical flow between two sequential frames, wherein the two sequential frames comprise a first frame and a second frame that is subsequent the first frame;

generating from the optical flow, using a first autoencoder neural network:
 a predicted optical flow between the first frame and the second frame; and
 a confidence mask that comprises a plurality of confidence values characterizing uncertainty in the predicted optical flow between the first frame and the second frame;

warping a reconstruction of the first frame according to the predicted optical flow and subsequently applying a blurring operation according the confidence mask to obtain an initial predicted reconstruction of the second frame;

generating, using a second autoencoder neural network, a prediction of a residual that is a difference between the second frame and the initial predicted reconstruction of the second frame;

combining the initial predicted reconstruction of the second frame and the prediction of the residual to obtain a predicted second frame;

wherein:
 each of the first and second autoencoder neural networks respectively comprise an encoder network and a generator network; and
 the generator network of the second autoencoder neural network is a component of a generative adversarial neural network (GANN).

* * * * *